United States Patent [19]

Nagasawa

[11] Patent Number: 4,658,352
[45] Date of Patent: Apr. 14, 1987

[54] COMPUTER SYSTEM WITH A BACK-UP POWER SUPPLY

[75] Inventor: Kunihiko Nagasawa, Tokyo, Japan

[73] Assignee: Pioneer Electronic Corporation, Tokyo, Japan

[21] Appl. No.: 616,137

[22] Filed: Jun. 1, 1984

[30] Foreign Application Priority Data

Jun. 2, 1983 [JP] Japan .............. 58-084682[U]

[51] Int. Cl.[4] .......... G06F 11/08; G06F 1/00
[52] U.S. Cl. .................. 364/200; 365/229; 371/66
[58] Field of Search ... 364/200 MS File, 900 MS File; 371/53, 57, 65, 66; 365/226, 227, 228, 229

[56] References Cited

U.S. PATENT DOCUMENTS

| | | | |
|---|---|---|---|
| 4,143,283 | 3/1979 | Graf et al. | 364/900 |
| 4,251,883 | 2/1981 | Grants et al. | 371/66 |
| 4,307,455 | 12/1981 | Juhasz et al. | 364/900 |
| 4,327,298 | 4/1982 | Burgin | 364/900 |
| 4,393,500 | 7/1983 | Imazeki et al. | 364/900 |
| 4,402,057 | 8/1983 | Itou et al. | 364/900 |
| 4,422,163 | 12/1983 | Oldenkamp | 365/229 |
| 4,458,307 | 7/1984 | McAnlis et al. | 364/200 |
| 4,580,248 | 4/1986 | Imaizumi | 365/229 |

Primary Examiner—Gareth D. Shaw
Assistant Examiner—Kevin A. Kriess
Attorney, Agent, or Firm—Schwartz, Jeffery, Schwaab, Mack, Blumenthal & Evans

[57] ABSTRACT

A computer system having a back-up power supply for preserving the contents of a memory during a power down mode where the power current is supplied from the back-up power supply, is characterized by writing a check data in a predetermined area of the memory and discriminating between a reset operation after a normal throw-in of the power current and a reset operation after recovering from the power down mode, by detecting the contents of the check data upon starting of the reset operation of the central processing unit of the computer system, whereby eliminating a discrimination circuit conventionally equipped to computer systems for the discrimination between the reset operations.

4 Claims, 12 Drawing Figures

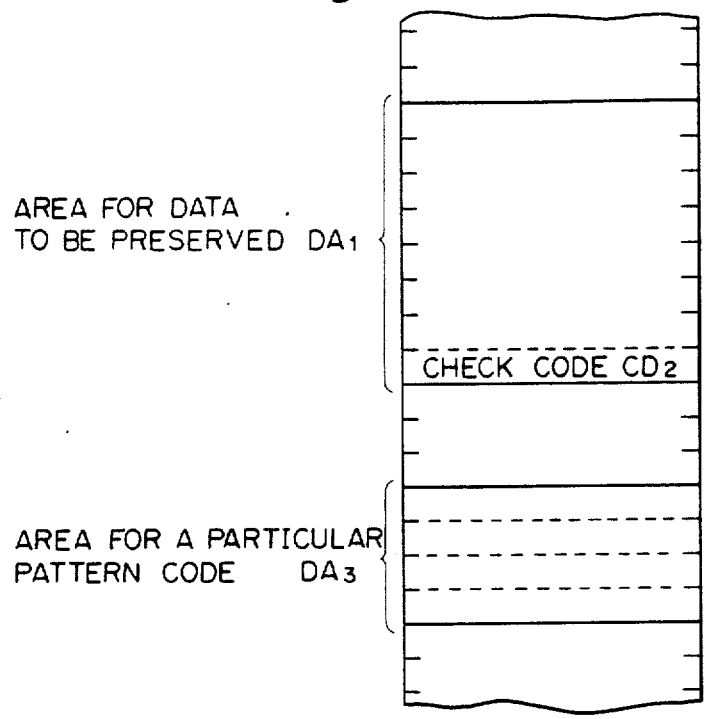
*Fig. 4*
*Fig. 5A* Vcc
*Fig. 5B* INT
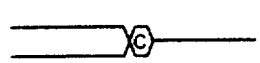
*Fig. 5C* OPERATION OF CPU

COMPUTER SYSTEM WITH A BACK-UP POWER SUPPLY

BACKGROUND OF THE INVENTION

1. Field of the Invention

The present invention relates to a computer system, and more specifically to a computer system equipped with a back-up power supply system for holding the contents of a memory device.

2. Description of Background Information

In computer systems, the initialization, i.e., a process of setting counters, switches and addresses to zero or other starting values, is required at each time of "power-on" of the system. However, in the case of the computer systems having a back-up power supply, it is not desirable if the initialization of the memory takes place after recovering from a "power down mode" in which the power current is supplied from the back-up power supply. Conventionally, to avoid such a condition, a particular circuit is provided for discriminating types of reset operation, that is, a power-on reset after the normal throw-in of the power current and a reset operation after recovering from the "power down mode", so that the initialization of the computer system is effected only in the case of the normal reset operation after the throw-in of the power current. However, the drawback was that the provision of such a discrimination circuit has resulted in an increase in cost and it is desirable to realize the function of such circuit without using any additional circuit.

SUMMARY OF THE INVENTION

An object of the present invention is therefore to alleviate the above drawbacks of the conventional computer systems, and to provide a computer system in which the discrimination between the two modes of reset start operation of the CPU (Central Processing Unit) is performed within the normal structure of the computer system, that is, without the necessity of additional circuits.

According to the present invention, a computer system equipped with a back-up power supply for holding the contents of a memory, during a down period of the level of the power voltage from the power supply, is characterized by writing a check data in a predetermined area of a memory, and discriminating between the power-on reset operation and the reset operation after recovering from the "power down mode" by comparing the contents of the check data upon starting the reset operation of the CPU.

The further scope of applicability of the present invention will become apparant from the detailed description given hereinafter. However, it should be understood that the detailed description and a specific example, while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein:

FIG. 4 is a diagram showing the contents of the RAM (Random Access Memory) of the computer system of FIG. 3; and FIGS. 5A through 5C are timing charts showing the operation of the computer system of FIG. 3 during a process for generating the check code.

DESCRIPTION OF THE PREFERRED EMBODIMENT

Figure 1:
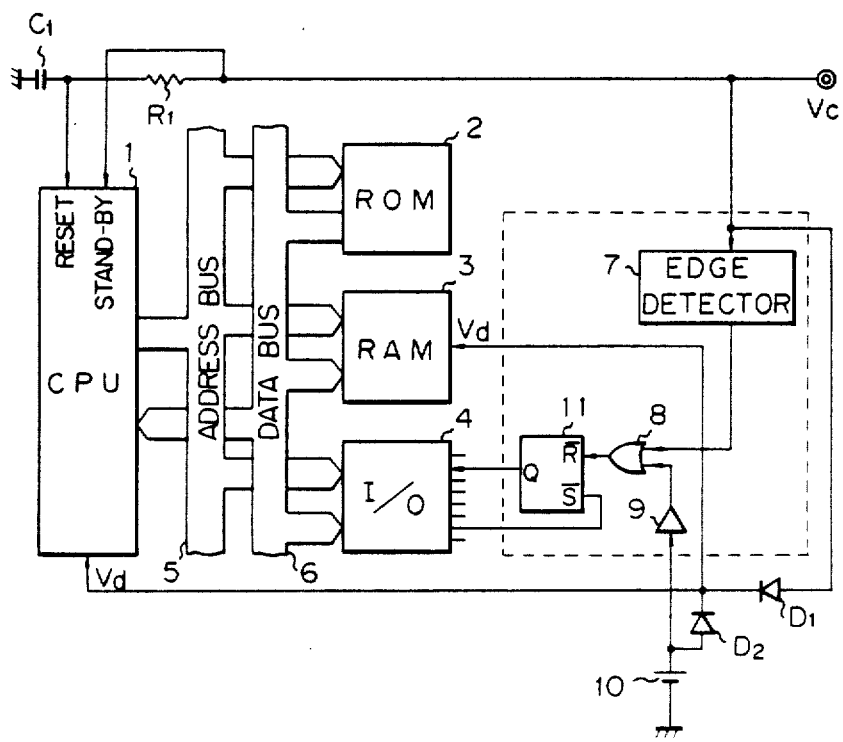
FIG. 1 is a block diagram showing an example of a conventional computer system with a back-up power supply and the circuit for discriminating the reset operations.

Before entering into the explanation of the preferred embodiment of the present invention, reference is first made to FIG. 1, in which an example of the construction of the conventional computer system is illustrated.

As shown, the computer system includes a CPU (Central Processing Unit) 1, a ROM (Read Only Memory) 2, a RAM (Random Access Memory) 3, and an I/O (Input/Output) unit 4. For the connection among the CPU 1, ROM 2, RAM 3, and I/O unit 4, there are provided an address bus 5 and a data bus 6. A power voltage Vc from a system power supply (not shown) is directly applied to a stand-by terminal of the CPU 1, an edge detector 7, and to a power supply terminal Vd of the CPU 1 via a diode $D_1$. The power voltage Vc is further applied to a series circuit of a resistor $R_1$ and a capacitor $C_1$ having a terminal thereof grounded, and the voltage developed at a junction between the resistor $R_1$ and the capacitor $C_1$ is applied to a reset terminal of the CPU 1.

An output signal of the edge detector 7 is then applied to one of two input terminals of two input OR gate 8. To the other input terminal of the OR gate 8, there is connected an output signal of a level comparator 9 which receives an output signal of a back-up power supply 10. The back-up power supply is, for example, made up of a battery or a high-capacity condenser. An output voltage of this back-up power supply 10 is supplied to a power supply terminals of the RAM 3 and the CPU 1 via a diode $D_2$ Further, the diodes $D_1$ and $D_2$ together form the so-called wired OR circuit, so that the power current is supplied to the CPU 1 and the RAM 3 through the diode $D_1$ when the system power supply is operating properly. On the other hand, in the case of a "power down mode" (a down level of the power voltage from the system power supply), the power voltage from the back-up power supply 10 is applied to the power voltage terminals Vd of the CPU 1 and the RAM 3 via the diode $D_2$.

An output signal of the OR gate 8 is applied to a reset terminal of an FF (flip flop) 11 whose Q output signal is applied to the I/O unit 4, and the OR gate 8 is set by an output signal of the FF 11.

Figure 2:
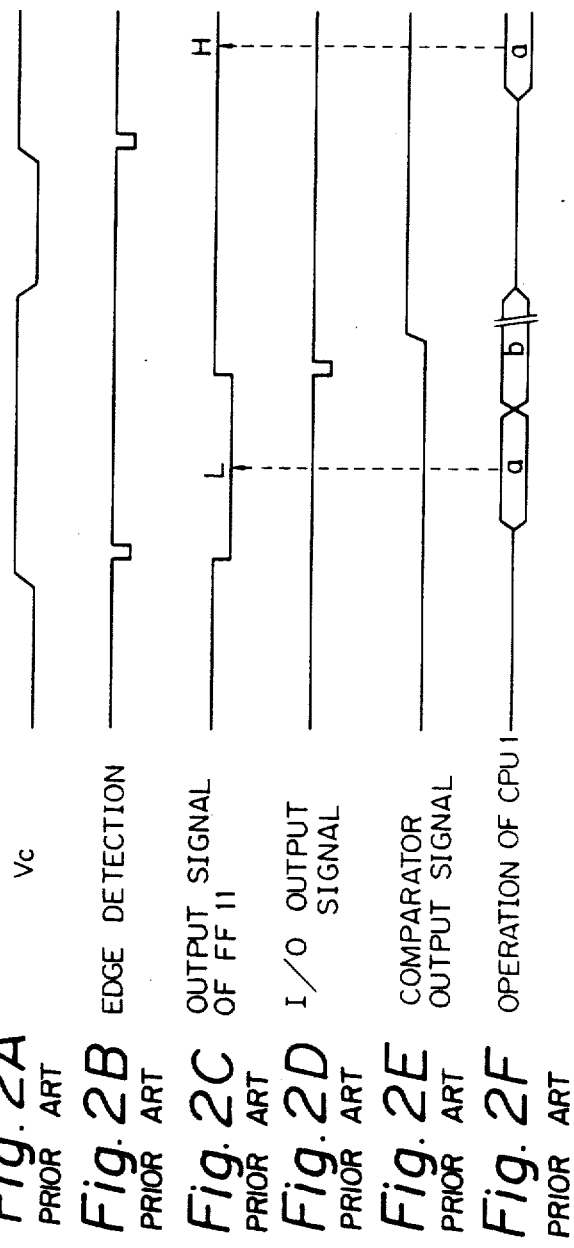
FIGS. 2A through 2F are timing charts showing the operation of the computer system of FIG. 1.

Turning to FIGS. 2A to 2F, the operation of the computer system of FIG. 1 will be explained hereinafter. When the power voltage from the system power supply rises up as shown in FIG. 2A, a detection pulse signal is produced by the edge detector 7 in response to the timing of the leading edge of the power voltage, as shown in FIG. 2B. If, in this timing, the voltage level of the back-up power supply is lower than a reference voltage level established in the comparator 9, then this detection pulse signal is applied to the reset input terminal of the FF 11 through the OR gate 8. Therefore, the Q output signal of the FF 11 turns to a low level (see FIGS. 2C and 2E).

On the other hand, when the output signal level of the back-up power supply is within a normal voltage range, the level of the output signal of the level comparator remains at a high level. Therefore, the edge detection pulse signal is rejected at the OR gate 8 and the FF 11 is not applied with the output signal of the level comparator 9 (also, see FIGS. 2C and 2E).

After a reset start by the application of the power current, the CPU 1 monitors the Q output signal level of the FF 11 through the I/O unit 4. If the Q output signal is at the low level as shown in FIG. 2C, the CPU 1 judges that the power-on reset should be done, and performs the initial setting such as a RAM clear operation. If, on the other hand, the output signal level of the Q output signal of FF 11 is high, a normal back-up power voltage is applied and the backup operation of the time of power down is performed, and further the CPU 1 judges that a reset of the release from the power down mode should be effected, and the CPU 1 operates so as not to perform the initial setting of the RAM data. In FIG. 2F, the character a indicates the operation of the level detection of the FF 11, and the character b indicates the operation of the initialization of the RAM. In the case of the initialization of the RAM, the FF 11 is set by means of the output signal from the I/O unit 4 so as to provide for the next cut-off of the system power supply.

However, as mentioned before, the computer system of FIG. 1 requires the circuit portions enclosed by the dashed line for the discrimination between the normal power-on reset operation and the reset operation after being released from the stand-by mode by the back-up power supply during a power down period, when the CPU 1 is reset started by the application of the voltage Vc from the system power supply. Also, in the I/O unit 4, a couple of lines used only for the mutual connection to the FF 11 are required, and resulted in cost increase.

The embodiment of the computer system of the present invention will be explained with reference to FIGS. 3 to 5 hereinafter.

Figure 3:
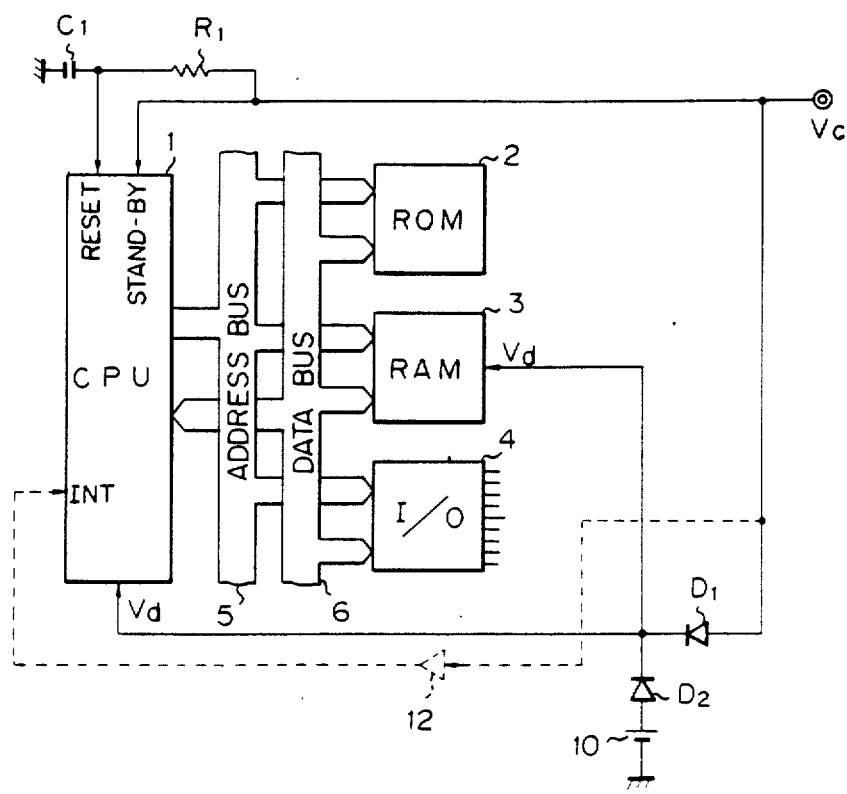
FIG. 3 is a block diagram showing an embodiment of the computer system of the present invention.

As shown in FIG. 3, the computer system of the present invention includes a CPU (Central Prosessing Unit) 1, a ROM (Read Only Memory) 2, a RAM (Random Access Memory) 3, an I/O (Input/Output) unit 4. The connection among these elements are performed by an address bus 5 and a data bus 6. A power voltage from a system power supply (not shown) is directly applied to a stand-by terminal of the CPU 1, and to a series circuit of a resistor $R_1$ and a capacitor $C_1$ having a terminal thereof is grounded. A voltage developed at a junction between the resistor $R_1$ and the capacitor $C_1$ is applied to a reset terminal of the CPU 1. Further, the voltage from the system power supply is applied to a power supply terminals Vd of the CPU 1 and the RAM 3 through a diode $D_1$. In addition, a backup power supply 10 which is, for example, made up of a battery or a high capacity condenser is provided and the voltage therefrom is applied to the power supply terminals Vd of the CPU 1 and the RAM 3 through a diode $D_2$. The cathode of the diode $D_1$ is connected to the cathode of the diode $D_2$. It will be appreciated that the edge detector 7, the OR gate 8, and the level comparator 9 and the FF 11 which are used in the conventional computer system of FIG. 1 are omitted in this computer system.

FIG. 4 is a diagram showing the memory contents of the RAM 3 of the computer system of FIG. 3. The RAM 3 stores various data, and it is assumed that the data to be protected is stored in a data area $DA_1$. Further, a predetermined check code $CD_2$ which is connected to the data in the data area $DA_1$ to be protected, is provided in the area $DA_1$. As an example, a check code such as the vertical parity or the check sum can be used as this check code $CD_2$ to be stored in the data area $DA_1$. In addition, the check code $CD_2$ in the data area $DA_1$ is amended each time when all or a part of the data to be protected in the data area $DA_1$ is altered. Instead of providing an area for the check code $CD_2$ in the data area $DA_1$ or in another part, there is provided an area $DA_3$ for a particular pattern, and a predetermined particular data is stored therein.

Generally, it is said that data in the RAM is undefined and have no regularity at the time of the normal power-on resetting. On the other hand, in the case of the time after recovering from the "power down mode", the data just before entering into that mode is preserved.

The system of the present invention is based on the difference between this irregularity of data in the time of normal power-on resetting and the preservation of the data after the "power down mode", and characterized by storing the check code CD2 and/or a particular pattern code PC3 in the RAM 3. Thus, it becomes possible to determine the type of reset operation by detecting the check code $CD_2$ or the particular pattern code $PC_3$ at the time of the reset start of the CPU 1. If there is no change in the check code $CD_2$ and/or in the particular pattern code $PC_3$, the reset operation is determined as the reset operation after being released from the "power down mode". If, on the other hand, there is a change, the reset operation is determined as the normal power-on reset operation, and the initialization of the data in the RAM 3 is perfomed. At the same time, a new check code $CD_2$ and/or a new particular pattern code $PC_3$ are generated and then written in the RAM 3.

In addition, the probability of a case where a check code identical to the former check code is accidentally generated due to the irregularity of RAM, is not equal to zero. However, the probability of this happening is very low and practically causes no problem. Further, with respect to the particular pattern data, the probability of an accidental conformation is equal to $\frac{1}{2}^8$, in the case of 8 the bit data. However, if 32 bits are used, then this value is reduced to the value of $\frac{1}{2}^{32}$, and practically there will be no problem. Moreover, if the check code and the particular pattern are used in combination, the probability value is further reduced to greatly improve the reliability of the system.

In setting the check code, there may be a chance where the system enters into the "power down mode" during generating the check code. Although this can happen only in a very rare case, this problem can be avoided by providing the system with a circuit which is indicated as a portion enclosed by the dashed lines of FIG. 3, for operating the system perfectly. Specifically, the circuit includes a level comparator 12 which receives the power voltage from the system power supply and whose output signal (comparator output signal) is applied to an interruption input terminal (INT) of the CPU 1. With this provision, when the voltage level of the power voltage is reduced, the CPU 1 is operated at an interruption processing operation, to generate the check code just before the voltage level of the power supply is reduced completely.

FIGS. 5A through 5C are timing diagrams respectively showing waveforms of the power supply voltage, and the comparator output signal to be applied to the interruption terminal of the CPU 1, and the operation of the CPU 1. The operation of the CPU 1 for generating the check code is indicated by the reference character c in FIG. 5C. Thus, by simply adding the level comparator 12, the above problem will be solved.

It will be understood from the foregoing, the type of reset operation is determined in the normal structure of the computer system, without using any additional circuits. Thus, the cost reduction is enabled while the reliability of the system is greatly improved.

What is claimed is:

1. A computer system that discriminates between a normal reset operation and a power down mode reset operation, said system comprising:
    a central processing unit,
    a random access memory,
    a data bus connecting said central processing unit and said random access memory,
    a main power supply connected to said central processing unit and said random access memory for supplying a main power current to said central processing unit and said random access memory,
    a back-up power supply connected to said central processing unit and said random access memory for supplying a back-up power current to said central processing unit and said random access memory when said main power current is not supplied from said main power supply for maintaining data stored in said random access memory,
    said central processing unit operative to write a check data in a predetermined area of said random access memory,
    said check data being changed upon the normal reset operation requiring a normal throw-in of said main power current from said main power supply; and
    said check data remaining unchanged upon the power down mode reset operation caused by a power down requiring recovery by a throw-in of back-up power current supplied from said back-up power supply,
    said central processing unit operative to detect the change in said data in said random access memory after a reset start of said central processing unit to discriminate between said normal reset operation and said power down mode reset operation.

2. A computer system as set forth in claim 1, wherein said check data is a particular data previously stored in said random access memory.

3. A computer system as set forth in claim 1, wherein said check data has a predetermined relation to said data stored in said random access memory.

4. A method of discriminating between a normal reset operation in a computer having a CPU and a RAM and a power down mode reset of the computer comprising the steps of:
    (a) storing data in a storage area of said RAM,
    (b) calculating a first check data determined from said stored data,
    (c) storing said first check data in said RAM,
    (d) upon detection of a reset operation, repeating the calculating step for determining a second check data,
    (e) upon occurrence of said normal reset operation, said first check data being changed,
    (f) upon occurrence of said power down mode reset operation, said first check data remaining unchanged, and
    (g) comparing said first and second check data, and determining when said first and second check data are unequal, indicating that said normal reset operation has occurred wherein main power to said computer is to be applied, and determining when said first and second check date are equal, indicating that said power down mode reset operation has occurred wherein back-up power is to be supplied to said computer.

* * * * *